May 24, 1932. A. C. PETERSON 1,859,461
MANUALLY SELECTIVE VARIABLE TRANSMISSION MEANS
Filed Dec. 6, 1928
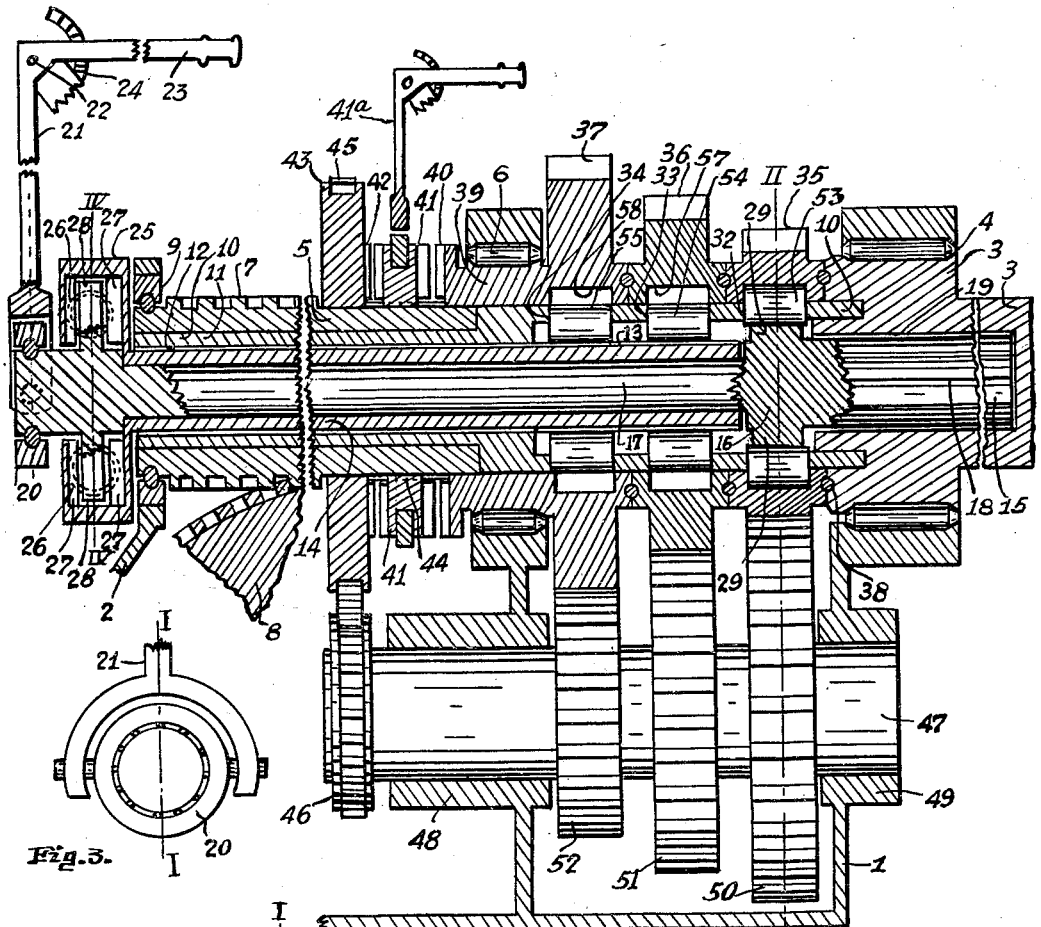
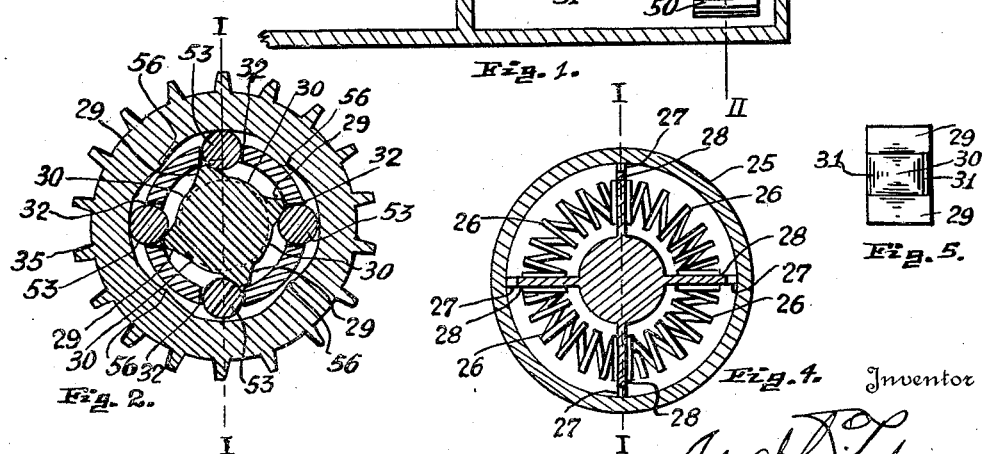
Inventor
Adolphe Peterson Patented May 24, 1932

1,859,461

UNITED STATES PATENT OFFICE

ADOLPHE C. PETERSON, OF MINNEAPOLIS, MINNESOTA

MANUALLY SELECTIVE VARIABLE TRANSMISSION MEANS

Application filed December 6, 1928. Serial No. 324,297.

My invention relates to transmission devices of the variable character and particularly to a transmission means which is selective in character and which has certain other characteristics wherefore it is called manually selective variable transmission means.

The principal devices and combinations of devices are as hereinafter described and as hereinafter defined in the claims. The principal object of my invention is to provide a variable transmission means for use particularly with automotive engines in automotive vehicles, which transmission means shall be simple in construction, simple in operation, durable in use, and cheap in manufacture while having the particular other characteristics. A principal object of my invention is to provide a transmission means which shall be power actuated and which shall at the same time have little complication and which shall at the same time be readily constructed and which shall be durable in use. A principal object of my invention is to provide a transmission means which shall impose upon the operator in use only the slightest of physical exertion and which shall be capable of variation of the transmission under any conditions of operation particularly in traffic conditions and in hill climbing and hill descending, without the usual difficulties of use in such situations. The general object of my invention is to provide an improved transmission means which shall have particular advantages in use especially for the unskilled operator.

In the accompanying drawings which illustrate my invention, like characters refer to like parts throughout the several views. Referring to the drawings:

Figure 1 is a view chiefly in vertical section through the axes of the principal operating shafts of the device, some parts being broken away and some parts being shown in full side elevation, this view being taken on the line I—I of Figures 2 and 3.

Figure 2 is a section at right angles to that of Figure 1 taken on the line II—II of Figure 1 this view showing a section through the low speed gear devices, the figures showing the device in the position for low speed engagement.

Figure 3 is a section at right angles to that of Figure 1 this section being taken through the control lever and its related part.

Figure 4 is a section on line IV—IV of Figure 1 at right angles to that of Figure 1.

Figure 5 is a detail view of an arc of the face of the cam shaft 16 between the peaks of two cams 29.

Referring first to the figures from 1 to 3 inclusive, the numeral 1 indicates a transmission case wherein the principal parts of the device are mounted, and the numeral 2 indicates a broken away portion of a differential casing which is related to and attached, preferably, to the transmission casing. These two portions of the casing, that is 1 and 2, are shown separated, and the parts between broken as it is contemplated that the portions on the left of Figure 1 would preferably occupy a great length in proportion to the length of the other parts, that is as shown. The transmission is shown in a form intended for use with front drive axles of automobiles, or front driving means, but it is contemplated that it may be as well used with a rear driving axle, with slight modifications.

The numeral 3 indicates a drive shaft, which is intended to be connected in the usual way through an engine clutch, not shown, with an internal combustion engine or any other form of engine. The drive shaft 3 is rotatably mounted by means of a large roller bearing 4 in the transmission case, this roller bearing being adapted to take end as well as radial thrusts. At the other or front end of the casing 1 a driven shaft 5 is rotatably mounted by means of a roller bearing 6 secured in the case 1. The roller bearing 6 likewise is adapted to take end as well as radial thrusts. The driven shaft 5 at its front end has constructed with it a worm 7 which in the usual manner of worm drives cooperates with a worm wheel 8 which latter is only partially shown. The worm wheel 8 while only shown in part is intended to be the usual form of worm wheel mounted by bearings in the differential casing 3 and adapted to drive an axle either directly or through Cardan shafts or to drive the front wheels of an automobile through Cardan shafts. The extreme front end of the driven shaft 5 forward of the worm 7 is rotatably mounted in a bearing 9 adapted to take end as well as radial thrusts.

A main shaft 10 is rotatably mounted by its rear end in the drive shaft 3 and by its front end in the driven shaft 5, so that, except as otherwise hereinafter described, it is freely mounted and may rotate freely of either of the drive or driven shafts. The main shaft 10 at its front portion has a smaller tubular form, its after portion being also tubular in form. The front portion is designated 11 and has on its interior wall keys 12 of small section but extending the entire length axially of the portion 11. These keys 12 are adapted to slide in keyways 13 in a slidable keyway shaft 14 which is also tubular. The keyway shaft 14 is slidable axially in the tube 11 the keyways 13 sliding on the keys 12 whereby the keyway shaft 14 is not rotatable with respect to the tube 11 and the main shaft 10 which is constructed integrally with the tube 11.

A cam shaft composed of three main parts 15, 16, 17, is mounted by its part 15 in the drive shaft 3, and by its part 17 in the keyway shaft 14. The part 15 has keyways 18 which are slidable axially of the shaft relative to and upon drive keys 19 formed integrally with the interior wall of a cylindrical bore formed in the front end of the drive shaft 3. Thus the part 15 of the cam shaft is slidable axially and in the bore of the drive shaft 3 but is not rotatable with respect to the drive shaft 3 since the two are bound by the keys and keyways and the drive shaft 3 may thereby drive the cam shaft. The part 17 of the cam shaft extends forwardly from the central part 16 through the keyway shaft 14 to the extreme front end, that is outside of the forward side of the differential casing 2 and at that extreme front end through a ball bearing 20 is controlled in its axial position by a control yoke lever 21 which latter is fulcrumed at 22 and by means of hand lever 23 may be stationed, the sector 24 performing a retaining function as is usual with such control levers.

The keyway shaft 14 at its extreme front end has constructed integrally with it or secured to it a drum 25 within which are located four springs 26, these springs being placed substantially in the form of a circle or square about the part 17 of the cam shaft, where the part 17 is extended beyond the keyway shaft. The springs 26 are located in the spaces between four pairs of retainer shoulders 27 which are constructed integrally with or secured to the interior of the drum 25 at equi-distant points about the part 17 of the cam shaft. The part 17 of the cam shaft has secured to or constructed with it four bars or posts 28 which are equi-distantly spaced circumferentially of the part 17 and are located within the drum 25, each bar or post 28 being stationed between the two shoulders of one pair of the retainer shoulders 27 normally. The posts 28 are adapted to be revolved with the part 17 in the drum 25 and when so revolved in either direction through a few degrees or an arc of a circle, the posts 28 will abut against the adjacent ends of the four springs 26 and carry or push the end of the spring thereby compressing the spring so that the springs then yieldably tend to return the posts 28 to their normal positions between the retainer shoulders 27 and thus to return the part 17 and the entire cam shaft 15, 16, 17 to its normal position with respect to the main shaft and keyway shaft, 10—11. Whichever way the cam shaft is revolved from its normal position with respect to the main shaft and keyway shaft 10—11 the springs therefore tend to return the cam shaft to the normal position. The springs 26 are at their ends so wound or so capped that they are readily engaged and disengaged by the posts 28. The springs are inserted by compression between their retainer shoulders 27 so that they tend to exert strong retaining urge upon the cam shaft to retain it in its normal position rotationally with respect to the main shaft but that urge or force is not so great but that it will be readily overcome in the engaging action under driving action upon the drive shaft 3, as hereinafter described.

The part 16 of the cam shaft 15, 16, 17 which is the central part with respect to the length of the cam shaft has four cams or lobes 29 equi-distantly spaced about the cam shaft, all in the same transverse plane of the cam shaft. These cams 29 have sloped approaches in each direction circumferentially of the cam shaft and the cams 29 are of such a height radially from the axis of the camshaft that they will perform the function hereinafter described. The recessed portions 30 of the cam face are only very slightly radially extended from the circle which is of the same diameter as the face of the keyway shaft 14 and the part 15 of the cam shaft to perform the function hereinafter described. The recessed portions 30 at their ends longitudinally of the cam shaft have inclined surfaces 31 whereby there is an easy approach to the recessed portions or faces 30 of the cam. The recessed faces 30 and the cams 29 lie in the same cross sectional or transverse plane of the cam shaft, and are substantially the same length longitudinally.

The main shaft 10 has in its side wall in three transverse planes, small rectangular openings 32, 33, 34, related respectively to the spur gears 35, 36, 37, the latter two of which are rotatably mounted upon the main shaft 10 as a bearing. The spur gears 35, 36, 37 are separated or spaced by balls 38 placed between them so that while they are very close together they will not have excessive friction in relative rotation. The spur gear 37 is secured to or constructed integrally with a short sleeve 39 which is rotatably mounted between the near end of the driven shaft 5 and its roller bearing 6 so that both the sleeve 39 and its spur gear 37 and the near end of the driven shaft 5 are rotatably supported by the roller bearing 6. The sleeve 39 at its front end has secured to it a dog clutch element 40 with which a double ended dog-clutch element 41 may engage when the latter is moved to its rearward position for forward driving of the automotive vehicle. The double ended dog clutch element 41 when in its forward position will engage a dog clutch element 42 secured to a sprocket wheel 43 which latter is otherwise loosely revolvable upon the driven shaft 5. In the central position or neutral position neither the spur gear 37 nor the sprocket wheel 43 is engaged to the driven shaft 5. The double ended dog clutch element 41 moves by its internal keys 44 over keyways related in the side of the driven shaft 5.

The sprocket wheel 43 by a chain 45 has cooperation with a sprocket wheel 46, the latter being secured to a secondary shaft 47 which is revolvably mounted in bearings 48, 49 in the case 1 below the main shaft 10. The secondary shaft 47 has secured to or constructed with it spur gears 50, 51, 52 which are in constant engagement respectively with the spur gears 35, 36, 37 and are of such relative size that the low speed engagement is secured by engagement of gears 35, 50, intermediate speed by engagement of gears 36, 51, and so that direct or high speed is secured by the direct engagement hereinafter described.

The rectangular openings 32, 33, 34 of the main shaft 10 each has located in it an engagement roller 53, 54, or 55. There are thus four engagement rollers 53 in one transverse plane and four rollers 54 in one transverse plane and four rollers 55 in another transverse plane. All of the rollers when in their normal disengaged position lie with substantially one half of their cross section within the main shaft 10 and the other half lying in the rectangular opening but only very slightly protruding from the main shaft outwardly or not at all. The rollers related to any spur gear 35, 36, 37 are adapted to engage their respective gear when protruded radially from the main shaft and this protrusion is procured in two stages, first a very slight protrusion which will just procure slight engagement with rachet teeth 56, 57, 58 respectively of the spur gears 35, 36, 37. The rachet teeth 56, 57, 58 are internal with the spur gears and have the same inclined approaches from either direction circumferentially as shown, whereby the same engagement may be obtained from either direction. Each spur gear 35, 36, 37 thus has four rachet teeth in its internal wall, but each spur gear 35, 36, and 37 has a sufficient internal bearing bore at each of its ends that the requisite bearing on the main shaft 10 is procured. At the second stage of protrusion of the rollers in the engagement action full and firm engagement of the spur gear to the main shaft 10 is secured.

The cam shaft 15, 16, 17 is shiftable axially by means of the yoke lever described and thus may be moved manually to either of three positions, one with the cams 29 and their recesses 30 in the transverse plane of the rachet teeth of the low speed spur gear 35, second, with the cams and recesses in the transverse plane of the intermediate spur gear 36, and third, with the cams and recesses in the transverse plane of the ratchet teeth in the spur gear 37 whereby direct engagement of the drive and driven shafts is procured. This shifting movement is not attempted until the engine clutch related to the drive shaft 3 is disengaged, but on such disengagement of the engine clutch the cam shaft is freely movable axially to either of its three positions. In this axial movement the cam shaft occupies its normal position rotationally relative to the main shaft and its keyway shaft 11 being so stationed by means of the springs 26 and in this normal position rotationally the cams 29 lie in a mid-position circumferentially between the rectangular openings and their related engagement rollers. The engagement rollers all are so located that they lie in four lines on the surface of the main shaft 10 whereby the cams 29 may be moved axially of the main shaft to either position without engaging any of the rollers. When so moved axially the inclined surfaces at the ends of the recesses 30 first engage the four rollers of any spur gear set and slightly lift these four engagement rollers so they emerge slightly axially from their positions so that they would then have the first engagement position, that of slight engagement with the related rachet teeth of the spur gear passed in the axial movement of the cam shaft.

On further movement the rollers would be passed and the next four rollers similarly slightly protruded to their first engagement positions. It is to be noted that the distance between the engagement rollers of each set should preferably be as great and slightly more than the length of the cam shaft part 16 whereby at no time is there danger of more than one set of rollers being protruded. When the cam shaft is thus stationed in any engagement position desired, by the operator, the operator then engages the engine clutch if propulsion is desired. The drive shaft 3 will then tend to revolve the cam shaft 15, 16, 17 in the same direction with it by means of the keys in the drive shaft and thereby the cam shaft will be slightly revolved from its normal position with respect to main shaft 10 as permitted by the springs 26. Thus the cams 29 will be revolved to engage the engagement rollers of the spur gear to be engaged and the cams 29 will then by their inclination tend to further protrude the engagement rollers selected and thus these selected engagement rollers will be protruded to their full and firm engagement positions whereby they are radially extended about one half their transverse section from the side of the main shaft 10 and thereby fully engage the ratchet teeth of the spur gear selected and thus firmly engage the spur gear selected to the main shaft 10 and to the cam shaft 15, 16, 17 and thus to the drive shaft 3. It is to be noted that the first engage position or protrusion will effect sufficient engagement so that the selected spur gear will exert some restraining force on the main shaft and thus the cam shaft will be forced against its springs 26 so that full protrusion of the engagement rollers selected is procured and thus firm engagement is procured of the gear selected.

It is to be noted that the springs 26 may be only very slightly restraining upon the cam shaft so that the engagement of the engine clutch and driving of the drive shaft 3 by the engine would procure relative rotation of the cam shaft to the main shaft by the slight friction of the spur gears upon the main shaft but it is preferable that the slight elevation of the recesses 30 be such that the first engagement position is positively induced and the firm engagement by the relative rotation thereby produced. The force of gravity and centrifugal force upon the engagement rollers may be relied upon to procure the first slight engagement which will produce the relative rotation of the cam shaft. As there are four rollers in each section or set one roller of each set is always in such position that gravity will produce the slight extension necessary if centrifugal force does not produce it. The cam shaft 15, 16, 17 may be magnetized and thus tend to keep the engagement rollers retired except when they are intended to be engaged. But under high speeds the speed of relative rotation of the gears will be such that the rollers will not protrude sufficiently to cause losses by impinging against the ratchet teeth of disengaged spur gears.

In all forward driving engagements or when such are desired the operator would by hand lever 59 and its yoke 60 move the double ended dog clutch element so that the spur gear 37 is engaged with the driven shaft 5, and for reverse driving the operator would by lever 59 engage the sprocket wheel 43 to driven shaft 5 whereby the parts are in position for reverse driving, the cams 29 being for reverse driving placed to engage either the intermediate or low speed gear 35 or 36. On any disengagement of the engine clutch the cam shaft immediately takes the normal position rotationally and on any reengagement of the engine clutch if the cam shaft is properly stationed the cams 29 engage the spur gear selected.

It is to be noted that the main shaft and the cam shaft are always in a predetermined position rotationally relative to each other when the drive shaft is disengaged from the engine by the engine clutch, the latter not being shown. And in this normal position there is no engagement of the cams 29 with any of the rollers and as the rollers are all in the same parallel alignment in four lines parallel to the axis of the cam shaft the cams 29 may pass between those lines of rollers as the cam shaft is moved by its control lever by the operator in changing gears, and there is therefore no obstruction to the easy movement of the cam shaft longitudinally when the engine clutch is disengaged. And whenever the engine clutch is disengaged the springs between the main shaft and cam shaft induce this normal position relatively. Likewise this normal position of the cam shaft relatively is induced whether and main shaft relatively is induced whether there has been driving torque from the engine to the gears or to the engine from the worm, that is from the automobile wheels as in going down hill when the engine is used as a brake. Whenever the torque reverses, that is whenever the engine acts as a brake upon the automobile wheels rather than the engine as a drive agency, the cam shaft will slow up relatively and move in the rearward direction relatively until it has passed from the forward engaging position rotatively through the normal position and to the next position engaging the rollers rearwardly. That is the cams 29 will move backward to the next set of rollers and engage them upon the opposite faces or sides and protrude them in the same manner so that the selected gear or drive then becomes engaged again for the braking action, this reversal and reengagement being automatic in its action and becoming induced whenever the torque reverses as described. Thus the braking engagement will become effective whatever the gear or drive selected, but if the operator desires he may readily select the low gear even when considerable speed has been attained down hill by disengaging the engine clutch so that the cam shaft and main shaft attain their relative normal positions, and he may then move the cam shaft to the gear drive desired and then re-engage the engine clutch whereupon the cam shaft will automatically engage the gear selected for the braking action as well as for the driving action. The engagement of the rollers is the same whether for the braking action or the driving action except that the cams move backwardly rotatively until the cams engage the next succeeding rollers backwardly.

While I have shown particular devices and combinations of devices in the illustration of my invention, I contemplate that other devices and combinations of devices may be used in the realization of my invention without departing from the spirit and contemplation of my invention.

What I claim is:

1. In a transmission means, a drive element and a driven element, transmission sets adapted to form driving means between the drive element and the driven element, engagement elements severally related to individual transmission sets and adapted to engage the related transmission set between the drive element and the driven element, a cam element movable axially of individual elements of the transmission sets and having rotational relation to the engagement elements and having yieldable means normally stationing the cam element and the engagement elements in an unengaged position relatively and adapted on application of driving torque against the cam element to form engagement through the engagement elements with a selected individual element of a transmission set.

2. In a transmission means, a drive element and a driven element, transmission sets adapted to form driving means between the drive element and the driven element, engagement elements severally related to individual transmission sets and adapted to engage the related transmission set between the drive element and the driven element, a cam element movable axially of individual elements of the transmission sets and having rotational relation to the engagement elements and having yieldable means normally stationing the cam element and the engagement elements in an unengaged position relatively and adapted on application of driving torque against the cam element to form engagement through the engagement elements with a selected individual element of a transmission set and means whereby the axial position of the cam element is manually controlled.

3. In a transmission means, a drive element and a driven element, transmission sets adapted to form driving means between the drive element and the driven element, engagement elements severally related to individual transmission sets and adapted to engage the related transmission set between the drive element and the driven element, a rotatable element movable axially of individual elements of the transmission sets and having rotational relation to the engagement elements and having yieldable means normally stationing the rotatable element and the engagement elements in an unengaged position relatively and adapted on application of driving torque against the cam element to form engagement through the engagement elements with a selected individual element of a transmission set and means whereby the axial position of the rotatable element is manually controlled.

4. In a transmission means, a drive element and a driven element, transmission sets adapted to form driving means between the drive elements and the driven element, engagement elements severally related to indivdual transmission sets and adapted to engage the related transmission set between the drive element and the driven element, a rotatable element movable axially of individual elements of the transmission sets and adapted on application of driving torque against the rotatable element through the engagement elements to form engagement with a selected individual element of the transmission sets, yieldable means normally positioning the rotatable element in an unengaged position.

5. A transmission means comprising a drive element and a driven element, a carrier shaft having rotatable relative thereto one transmission element of each of a plurality of transmission sets, engaging elements severally related to the transmission elements of the carrier shaft, an inducing element normally rotatable with the carrier shaft and capable of a rotation relative to the carrier shaft, means whereby the inducing element may be axially located for cooperation with a selected engaging element, and means whereby the torque of drive through the transmission may be imparted to the inducing element for inducing engagement of a selected transmission element in the drive by its engaging element.

6. A transmission means comprising a drive element and a driven element, a carrier shaft having concentric therewith one transmission element of each of a plurality of transmission sets, engaging elements severally related to the transmission elements of the carrier shaft, an inducing element having torque connection with one of the drive and driven elements and capable of a prescribed rotation relative to the carrier shaft, means whereby the inducing element may be controlled for selection of inducement of engagement through a selected engagement element, the inducing element having a means for procuring in the selected relation engagement of the selected engagement element with its transmission element.

7. A transmission means comprising a drive element and a driven element, a carrier shaft having concentric therewith one transmission element of each of a plurality of transmission sets, engaging elements severally related to the transmission elements of the carrier shaft and carried by the carrier shaft, an inducing element having torque connection with one of the drive and driven elements and capable of a prescribed rotation relative to the carrier shaft, means whereby the inducing element may be controlled for selection of inducement of engagement through a selected engagement element, the inducing element having a means for procuring in the selected relation engagement of the selected engagement element with its transmission element.

8. A transmission means comprising a drive element and a driven element, a carrier shaft having concentric therewith one transmission element of each of a plurality of transmission sets, engaging elements severally related to the transmission elements of the carrier shaft and carried by the carrier shaft, an inducement element having torque connection with one of the drive and driven elements and capable of a prescribed rotation relative to the carrier shaft, means whereby the inducing element may be controlled for selection of inducement of engagement through a selected engagement element by axial displacement relatively to the carrier shaft the inducing element having a means for procuring in the selected relation engagement of the selected engagement element with its transmission element.

9. A transmission means comprising a drive element and a driven element, a carrier shaft having concentric therewith one transmission element of each of a plurality of transmission sets, engaging elements severally related to the transmission elements of the carrier shaft and carried by the carrier shaft, an inducement element having torque connection with one of the drive and driven elements and capable of a prescribed rotation relative to the carrier shaft and having yieldable locating means normally placing the inducement element in the disengaged position rotatably of the carrier shaft, means whereby the inducing element may be controlled for selection of inducement of engagement through a selected engagement element by axial displacement relatively to the carrier shaft, the inducing element having a means for procuring in the selected relation engagement of the selected engagement element with its transmission element.

In witness whereof I have hereunto set my hand this 20th day of April, 1928.

ADOLPHE C. PETERSON.